July 19, 1949.
A. H. EMERY
2,476,713
ZEROIZING MEANS FOR DIAL INDICATORS
Filed April 24, 1945
Fig.1.
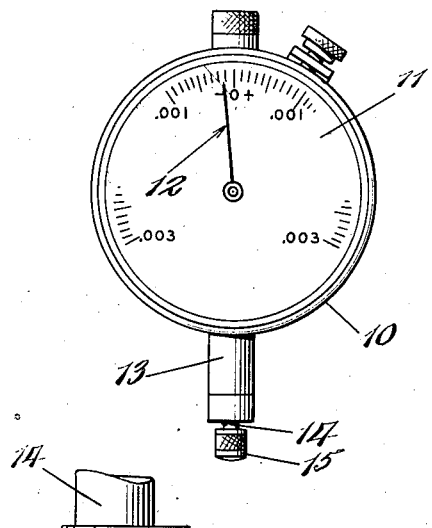
Fig.2.
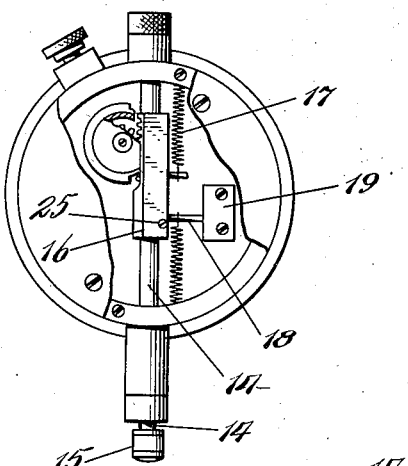
Fig.3.
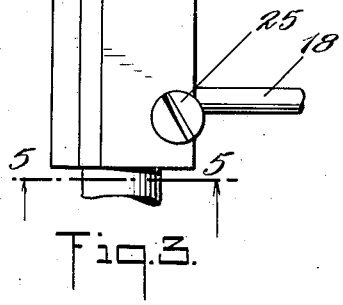
Fig.5.
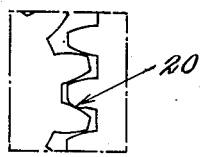
Fig.4.
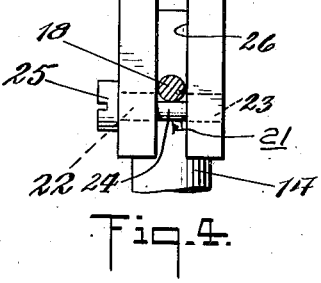
Fig.6.
INVENTOR
ALFRED H. EMERY
BY *Darby + Darby*
ATTORNEYS Patented July 19, 1949

2,476,713

UNITED STATES PATENT OFFICE 2,476,713

ZEROIZING MEANS FOR DIAL INDICATORS

Alfred Hamilton Emery, Wappingers Falls, N. Y., assignor to Standard Gage Company, Inc., Poughkeepsie, N. Y., a corporation of New York Application April 24, 1945, Serial No. 589,982

2 Claims. (Cl. 33—172)

The present invention relates to a dial gage and particularly to a means for adjusting the position of the gear train of such a gage so that over its normal range of operation the gage will yield accurate readings.

In the past it has been common practice in inspecting and testing dial gages for precision measurement of the type such as is here disclosed to check the gages by utilization of Johansson or Hoke blocks and if it was found that over the useful range of measurement the gage was not accurate to assume that this inaccuracy resulted from slight inaccuracies in the gear train and to overcome the condition by disassembling the gage and rotating one of the gears through a tooth space to thereby place different teeth in contact and eliminate the error. In some instances as much as eight hours have been spent on a single gage by this trial and error method before the gage was caused to register accurately. My present invention provides a means of adjustment between the measuring plunger of the indicator and the gear train thereof to thereby place different gear and rack teeth in contact through the useful measuring range of the instrument and thus provide a means by which final adjustment can be achieved without disassembling the instrument.

It is an object of my invention to provide a means for adjusting the position of the measuring plunger of a dial indicator with respect to the elements of the gear train of such an indicator to thereby provide a means of adjusting the indicator to give accurate readings throughout its useful range.

It is a further object of my invention to provide such an adjusting means which is simple and economical of manufacture and is conveniently and easily adjusted by means of common tools and without the need for skilled labor.

Other objects and features of my invention will be apparent when the following description is read in connection with the accompanying drawings in which—

Figure 1 is a front elevational view of a dial indicator illustrating the type of indicator to which my invention may be applied;

Figure 2 is a rear elevational view of the indicator of Figure 1, the cover being broken away to illustrate the interior mechanism and particularly the adjustment means of the present invention;

Figure 3 is an enlarged detail view of a portion of the structure of Figure 2 illustrating particularly the adjustment means with respect to the ease with which such means may be operated;

Figure 4 is an enlarged detail view of the same parts as is shown in Figure 3 the view being taken, however, at right angles to that of Figure 3 and showing particularly the manner in which the adjustment means alters the relation between the measuring plunger of the gage and the rack which is the first element of the gear train;

Figure 5 is a cross-sectional view taken on the plane of the line 5—5 of Figure 3 and showing the adjustment means; and Figure 6 is a fragmentary view of meshing teeth of two gears of the gear train illustrating the necessity for adjustment to avoid imperfect teeth being in action during measurements over the useful range of the instrument.

Referring now to the drawings there is shown in Figure 1 a dial indicator gage comprising the usual body portion 10, dial 11, pointer 12, housing extension 13, measuring plunger 14 and contact button 15. This dial indicator gage is of the shockproof type as disclosed in Emery Patent No. 2,178,745, issued on November 7, 1939.

As seen in Figure 2 the indicator is made shockproof by virtue of the rack 16 being slidably mounted on the measuring plunger 14 and being urged in a measuring direction by the spring 17 and being permitted to move in a measuring direction only when the pin 18 fastened to plunger 14 moves upwardly in a groove in guide block 19.

In adjusting a gage it is essential that over a portion of its range all readings be exact. For example, in such a gage as that shown in Figure 1, final testing would be performed by utilizing Johansson blocks. For example, a block 1″ in thickness would be placed on the anvil of a comparator and the gage adjusted until the pointer was exactly on the zero division. Thereafter, a block or stack of blocks measuring 1.001″ would be substituted for the 1″ block and the hand of the gage should then rest on the +.001 graduation. If it does so lie the 1.001″ stack of blocks is removed from the comparator and a stack of blocks of 0.999″ is substituted. At this time the gage hand should rest on the —.001 graduation and, of course, if it does the gage is accurate within the commonly used range of measurement thereof and is deemed to be correct.

However, it not infrequently occurs that due to irregularities in the contours of the teeth of the gears or the rack of the instrument, the gage will not give the proper reading at either the upper or the lower limit or both. The teeth of these gears are of involute form and are very small and consequently very difficult to produce. Any slight inaccuracy in the contours of the gear teeth such, for example, as the elevation shown at 20 in Figure 6, will produce an erroneous reading and in the past the only way of adjusting the gage to eliminate this condition was to disassemble the gage and rotate the offending gear, or move the rack, or otherwise alter the relationship between the gear teeth in such manner that the imperfect tooth would not be in contact with another tooth during the movement of the hand over the useful range as above described. Thus if upon inserting the stack of blocks measuring 1.001" in the example above given, the hand did not come to the .001 graduation, the gage was disassembled and a gear rotated through a few tooth spaces and then reassembled and the test made again. Of course, if the test was this time successful the following test with the stack of blocks of .999" was made, while if the test was unsuccessful the gage was then disassembled and reassembled until success was achieved. In the same manner the test with the .999 stack of blocks was repeated until the gage gave a reading of —.001.

By my present invention I have eliminated all of this disassembling and reassembling of the gage. This has been accomplished by substituting for the usual round pin, which pin cooperates with pin 18 to limit the motion of the rack with respect to the plunger, an eccentric pin 21 (see Figure 4) which likewise cooperates with the pin 18 but renders the relationship of the limit of movement of the rack with respect to the plunger adjustable.

Referring now to Figures 3, 4 and 5, there is shown therein in enlarged detail the eccentric pin 21 which pin comprises the two co-axial end portions 22 and 23 and the eccentric central portion 24, the pin being provided with a slotted head 25. This pin 21 extends across the slot 26 in the rack member 16 and cooperates with the pin 18 which, as has been stated, is fixed in and extends from the plunger 14. Thus by rotating the pin 21 the position of the rack with respect to the plunger may be altered and clearly such alteration will affect the gear train so that different teeth will be in contact at the time when the hand reads at either of its limits as well as at its zero point. Therefore, it is only necessary, after testing to find whether or not the hand moves properly to the .001 graduation when the stack of blocks of 1.001 dimension is in the comparator, to slightly rotate the eccentric pin 21 to establish this relationship if it does not exist, thereby completely eliminating the necessity for disassembling and reassembling the gage. Of course, after the upper limit has been properly set, a test for the lower limit is likewise made and if this test shows that there is an error, readjustment of the eccentric pin is made following which the test for the upper limit must be again made in order to insure that the readjustment has not so altered the gear tooth relationship as to insert a new error into the measurement at the upper limit. This however, is readily done since it requires, as has been stated, no disassembling or reassembling of the gage structure.

While I have described a preferred embodiment of my invention, it is to be understood that this description is for purposes of illustration only and no limitation is to be implied other than that of the appended claims.

What is claimed is:

1. In a gear driven dial indicator of the shockproof type having a measuring plunger, a rack slidable thereon, an indicating pointer and a gear train interconnecting the rack and pointer, means for adjusting the relationship of said rack to said plunger and thereby adjusting the relationship of said gears of said gear train to each other to remove the effects of defects in the gear teeth, said means comprising an eccentric pin in said rack, said pin cooperating with said plunger to determine the relationship therebetween.

2. In a gear driven dial indicator of the shockproof type having a measuring plunger with an abutment thereon, a rack slidable thereon, an indicating pointer and a gear train interconnecting the rack and the pointer and in which the position of the rack is determined by the position of the abutment on the plunger, means for adjusting the position of the rack with respect to the plunger, said means comprising an eccentric pin rotatably mounted in the rack and having its eccentric portion cooperating with the abutment on the plunger, whereby rotation of the said eccentric pin will alter the position and relationship of the rack with respect to the plunger and thereby determine the teeth of the gear train which are in contact over the useful range of measurement of the indicator and eliminate erroneous readings resulting from slight defects in the gear tooth contours.

ALFRED HAMILTON EMERY.

REFERENCES CITED

The following references are of record in the file of this patent:

UNITED STATES PATENTS

| Number | Name | Date |
|---|---|---|
| 1,350,769 | Bartlett | Aug. 24, 1920 |
| 1,361,848 | Green | Dec. 14, 1920 |
| 1,433,076 | Green | Oct. 24, 1922 |
| 2,178,745 | Emery | Nov. 7, 1939 |
| 2,303,858 | Ostberg | Dec. 1, 1942 |